(12) United States Patent
Mori (10) Patent No.: US 9,948,793 B2
(45) Date of Patent: Apr. 17, 2018

(54) ABNORMALITY NOTIFICATION APPARATUS, IMAGE FORMING APPARATUS AND ABNORMALITY NOTIFICATION METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinya Mori, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/692,949

(22) Filed: Apr. 22, 2015

(65) Prior Publication Data

US 2016/0316072 A1 Oct. 27, 2016

(51) Int. Cl.
*G06F 15/00* (2006.01)
*H04N 1/00* (2006.01)

(52) U.S. Cl.
CPC ....... *H04N 1/00076* (2013.01); *H04N 1/0049* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 2004/0187043 A1* | 9/2004 | Swenson | G06F 1/12 713/400 |
| 2006/0215218 A1* | 9/2006 | Ujigawa | H04N 1/00278 358/1.15 |
| 2008/0231887 A1* | 9/2008 | Sakagami | H04N 1/00204 358/1.15 |
| 2011/0249430 A1* | 10/2011 | Stamatatos | B60Q 1/2615 362/184 |
| 2014/0253953 A1* | 9/2014 | Oakley | G06F 11/30 358/1.15 |
| 2015/0062614 A1* | 3/2015 | Takatani | G06K 15/408 358/1.14 |
| 2016/0057303 A1* | 2/2016 | Fujita | H04N 1/00899 358/1.14 |

FOREIGN PATENT DOCUMENTS

JP 2006-015603 1/2006

* cited by examiner

*Primary Examiner* — Helen Q Zong
(74) *Attorney, Agent, or Firm* — Amin, Turocy & Watson LLP; Gregory Turocy (57) ABSTRACT

In accordance with one embodiment, an abnormality notification apparatus comprises a display device, a first drive circuit, at least one processor, a pulse generating circuit and a second drive circuit. The first drive circuit turns on the display device according to a control signal from a display control section. The processor operates according to separate programs. The pulse generating circuit outputs, during a period when a signal indicating an abnormality of any processor is input, a pulse signal corresponding to a blinking pattern for notifying the abnormality of the processor. The second drive circuit blinks the display device in response to the pulse signal output by the pulse generating circuit.

16 Claims, 7 Drawing Sheets

ABNORMALITY NOTIFICATION APPARATUS, IMAGE FORMING APPARATUS AND ABNORMALITY NOTIFICATION METHOD

FIELD

Embodiments described herein relate generally to an abnormality notification apparatus, an image forming apparatus and an abnormality notification method.

BACKGROUND

An apparatus provided with a plurality of processing units such as an image forming apparatus and the like is provided with a plurality of control circuit boards carrying processors such as SOC or CPU which operates according to separate programs. Conventionally, there is an image forming apparatus which displays an error on a display device on an operation panel in a case in which there is a control circuit board that cannot start normally. However, a conventional image forming apparatus cannot display an error correctly in a case in which the CPU controlling the display device cannot start normally. For example, an apparatus which operates the display device through a control signal from the CPU of a main control section cannot display an error correctly in a case in which the CPU of the main control section cannot operate normally.

DETAILED DESCRIPTION

In accordance with one embodiment, an abnormality notification apparatus comprises a display device, a first drive circuit, at least one processor, a pulse generating circuit and a second drive circuit. The first drive circuit turns on the display device according to a control signal from a display control section. The processor operates according to separate programs. The pulse generating circuit outputs, during a period when a signal indicating an abnormality of any processor is input, a pulse signal corresponding to a blinking pattern for notifying the abnormality of the processor. The second drive circuit blinks the display device in response to the pulse signal output by the pulse generating circuit.

Hereinafter, the embodiment is described with reference to the accompanying drawings.

Figure 1:
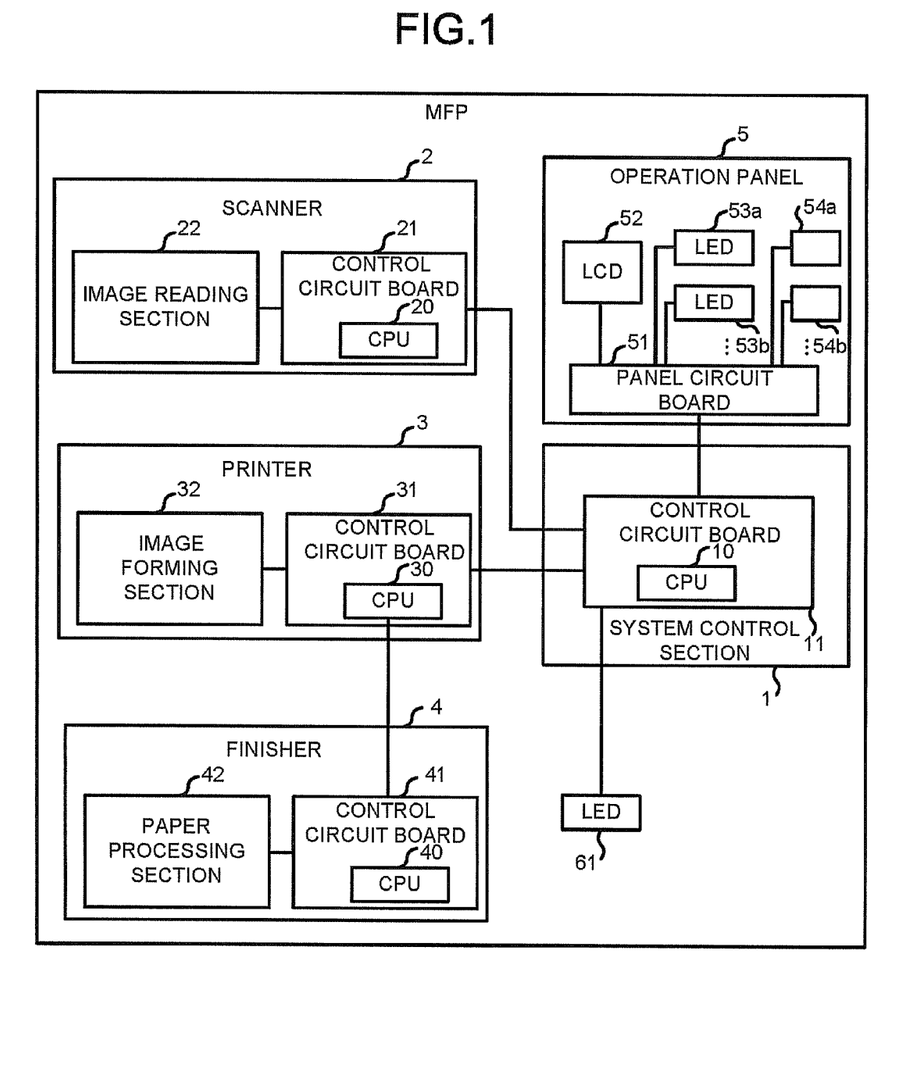
FIG. 1 is a block diagram schematically illustrating an example of the constitution of a digital multi-functional peripheral according to an embodiment.

FIG. 1 is a block diagram schematically illustrating an example of the constitution of a digital multi-functional peripheral according to the embodiment. The digital multi-functional peripheral (MFP) according to the present embodiment is provided with an image forming apparatus. In the example shown in FIG. 1, the digital multi-functional peripheral includes a system control section 1, a scanner 2, a printer 3, a finisher 4 and an operation panel 5.

The system control section 1 uniformly controls each section of the digital multi-functional peripheral. The system control section 1 includes a control circuit board (system control circuit board) 11. The control circuit board 11 functions as a control section for controlling the whole digital multi-functional peripheral (system). The control circuit board 11 carries a CPU 10 serving as a processor. The control circuit board 11 may also carry various memories or interfaces and the like in addition to the CPU 10. The control circuit board 11 may further carry an image processing circuit and the like. The CPU 10 of the control circuit board 11 is connected with the CPU of each section through an interface. The CPU 10 executes programs stored in the memory to carry out various processing. The system control section 1 may further connect an image processing section, an external interface, a storage device and the like with the control circuit board 11.

The scanner 2 serves as a processing unit which reads an image of a document and converts the read image into image data. The scanner 2 includes a control circuit board (scanner control circuit board) 21 and an image reading section 22. The control circuit board 21 functions as a control section of the image reading section 22. The control circuit board 21 carries a CPU 20 serving as a processor. The control circuit board 21 may also carry various memories or interfaces and the like in addition to the CPU 20. The CPU 20 of the control circuit board 21 is connected with the CPU 10 of the system control section 1 through an interface. The CPU 20 executes programs stored in the memory to carry out various processing in the scanner 2. For example, the CPU 20 controls the image reading section 22 in response to an instruction from the system control section 1 to read the image of the document.

The image reading section 22 is equipped with, for example, a CCD line sensor which converts the image on the reading surface of the document into image data. The image reading section 22 may be a device which scans the document placed on a document table glass or a device which reads the image of the document conveyed by an ADF (Auto Document Feeder). The CPU 20 outputs the image data of the document read by the image reading section 22 to the system control section 1.

The printer 3 is a processing unit which forms an image on paper serving as an image receiving medium. The printer 3 includes a control circuit board (printer control circuit board) 31 and an image forming section 32. The control circuit board 31 functions as a control section of the image forming section 32. The control circuit board 31 carries a CPU 30 serving as a processor. The control circuit board 31 may also carry various memories or interfaces and the like in addition to the CPU 30. The CPU 30 of the control circuit board 31 is connected with the system control section 1 through an interface. The CPU 30 executes programs stored in the memory to carry out various processing in the printer 3. For example, the CPU 30 controls the image forming section 32 in response to an instruction from the system control section 1 to form an image on the image receiving medium.

The image forming section 32 forms an image on the image receiving medium. The image forming section 32 may be a monochrome printer or a color printer. The image forming section 32 is not limited to a specific image forming type. For example, the image forming section 32 may be an electrophotographic type or an inkjet type image forming apparatus, or a thermal transfer type image forming apparatus.

The finisher 4 is a processing unit for processing the paper processed by the printer 3. The finisher 4 includes a control circuit board (FIN control circuit board) 41 and a paper processing section 42. The control circuit board 41 carries a CPU 40 serving as a processor. The control circuit board 41 may also carry various memories or interfaces and the like in addition to the CPU 40. The CPU 40 of the control circuit board 41 is connected with the CPU 30 of the printer 3 through an interface. The CPU 40 executes programs stored in the memory to carry out various processing in the finisher 4. The paper processing section 42 carries out finishing processing such as stapling processing, electronic sorting processing and the like on the paper printed by the printer 3. For example, the CPU 40 controls the paper processing section 42 in response to an instruction from the system control section 1 to carry out finishing processing on the paper.

The operation panel 5 serving as a user interface is provided with a panel circuit board 51, a LCD (display section) 52, a LED (display device) 53 (53a, 53b . . . ), a hard key 54 (54a, 54b . . . ) and the like.

The panel circuit board 51 is connected with the LCD 52, the LED 53 and the hard key 54. The panel circuit board 51 includes a drive circuit for driving the LCD 52 and the LED 53.

The LCD 52 includes, for example, a liquid crystal display device (LCD) attached with a backlight. The LCD 52 may include a touch panel on a display screen.

A plurality of LEDs 53 is arranged on the operation panel 5. The LED 53 notifies the operation status and the like of each section in a turning-on state. The LED 53, which is not limited to the LED, may be any display device that can be controlled to be turned on or turned off.

The hard key 54 may be a button for instructing various operations. For example, the hard key 54 is a start button, a reset button, a numeric key and the like. For example, the LED 53 is arranged in association with the hard key 54. For example, the LED 53 may irradiate the whole or part of the hard key 54 such as a start button, a reset button and the like.

A LED 61 may further be arranged in addition to the operation panel 5 as the whole digital multi-functional peripheral 1.

Next, a first constitution example for controlling the display of the LED in the digital multi-functional peripheral according to the embodiment is described.

Figure 2:
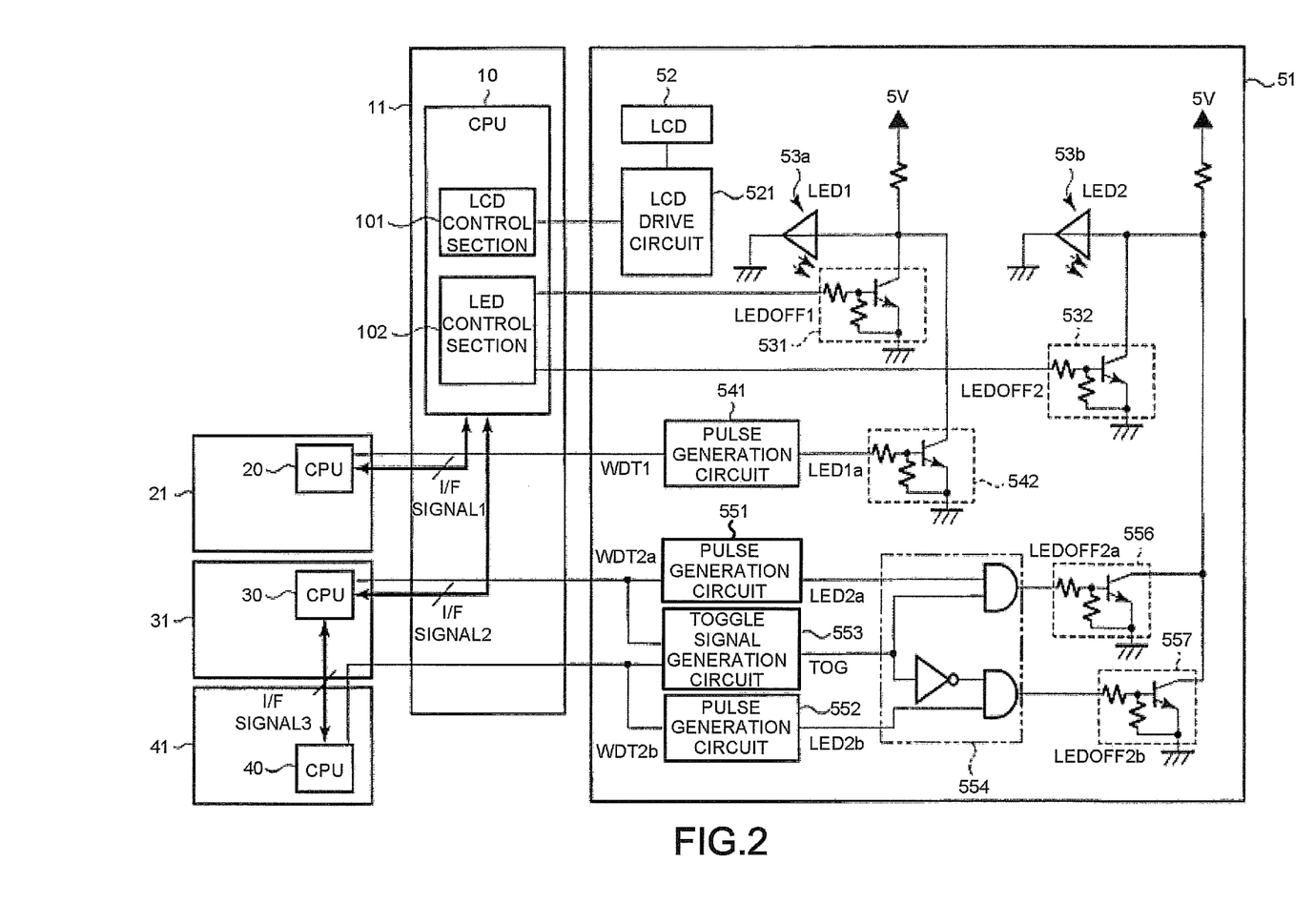
FIG. 2 is a block diagram illustrating a first constitution example of a control system in the digital multi-functional peripheral according to the embodiment.

FIG. 2 is a diagram illustrating the first constitution example of the panel circuit board 51 in the digital multi-functional peripheral.

Figure 3:
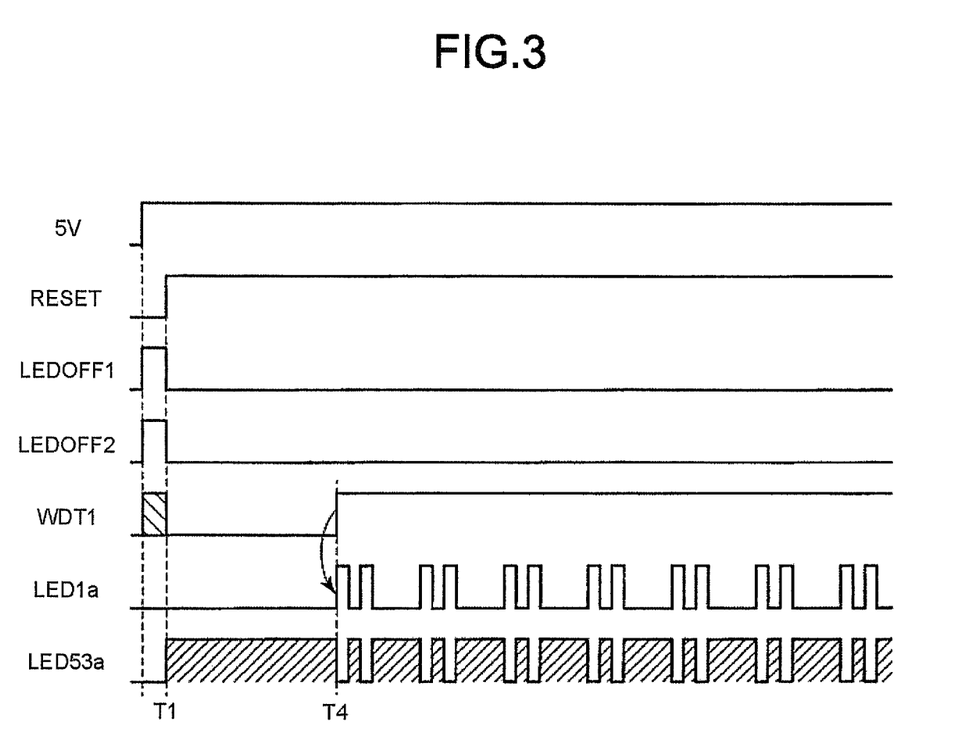
FIG. 3 is a timing chart in the control system of the first constitution example according to the embodiment.
Figure 4:
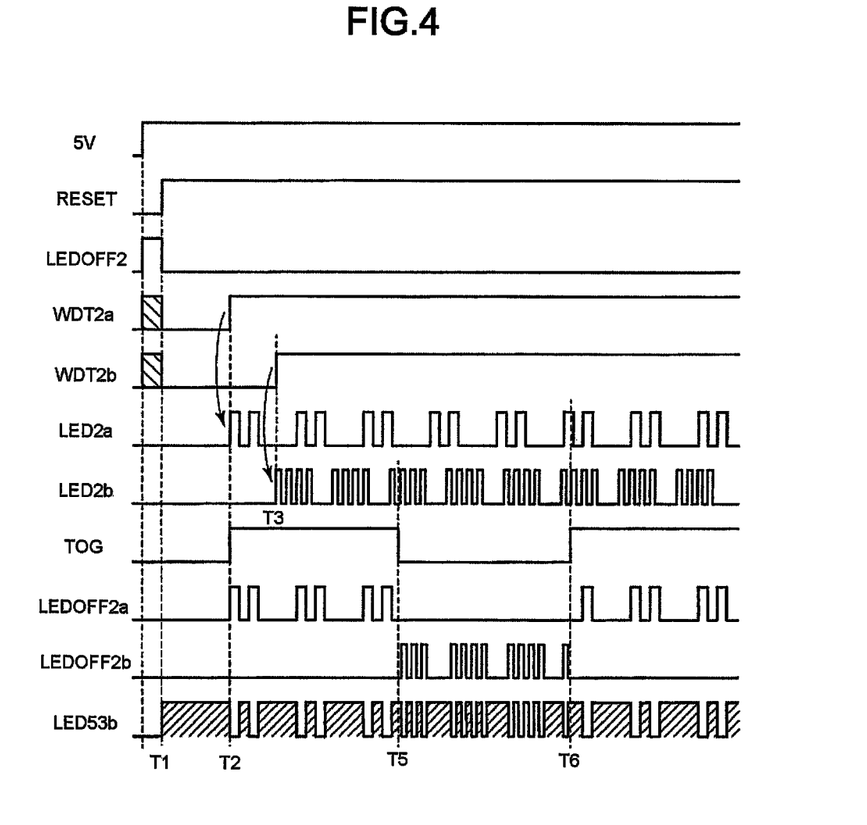
FIG. 4 is a timing chart in the control system of the first constitution example according to the embodiment.

FIG. 3 and FIG. 4 are timing charts illustrating an example of operation sequence in the first constitution example shown in FIG. 2.

First, the display control of the LED 53a in the first constitution example shown in FIG. 2 is described.

The CPU 10 of the system control circuit board 11 includes functions of a LCD control section 101 and a LED control section 102. For example, the functions of the LCD control section 101 and the LED control section 102 are realized by the CPU 10 which executes programs stored in the memory (not shown).

The CPU 10 serving as the LCD control section 101 controls the display of the LCD 52 through a LCD drive circuit 521 on the panel circuit board 51.

The CPU 10 serving as the LED control section 102 controls the display of the LED 53a through a drive circuit 531 on the panel circuit board 51. The CPU 10 outputs a control signal LEDOFF1 to the drive circuit 531 to control to turn on (turn off) the LED 53a.

The CPU 10 serving as the LED control section 102 controls the LED 53b through a drive circuit 532 on the panel circuit board 51. The CPU 10 outputs a control signal LEDOFF2 to the drive circuit 532 to control to turn on (turn off) the LED 53b.

In accordance with the constitution shown in FIG. 2, the LED 53a and the LED 53b operate according to the control of the CPU 10 in a case in which each control circuit board 21, 31 and 41 are operating normally.

The CPU 10 of the system control circuit board 11 is connected with the CPU 20 of the scanner control circuit board 21 through the interface. The CPU 10 and the CPU 20 communicate with each other through a first I/F signal. The CPU 10 of the system control circuit board 11 is connected with the CPU 30 of the printer control circuit board 31 through the interface. The CPU 10 and the CPU 30 communicate with each other through a second I/F signal. The CPU 30 of the printer control circuit board 31 is connected with the CPU 40 of the FIN control circuit board 41. The CPU 30 and the CPU 40 communicate with each other through a third I/F signal.

The CPU 20 of the scanner control circuit board 21 is directly connected with a pulse generating circuit 541 without the intervention of other CPU and the like. The CPU 20 outputs a signal WDT1 indicating the occurrence of abnormality to the pulse generating circuit 541 in a case in which the abnormality occurs. A watchdog signal for detecting the runaway of the CPU 20 may be used as the signal WDT1.

The pulse generating circuit 541 takes that the signal WDT1 becomes a value (from "L: low" to "H: high") indicating the occurrence of abnormality as a trigger to output a pulse signal LED1a. The pulse generating circuit 541 outputs the pulse signal LED1a in a period when the signal WDT1 is H. The pulse signal LED1a is a cyclic signal.

The drive circuit 542 cuts off the power supplied to the LED 53a in a case in which the pulse signal LED1a from the pulse generating circuit 541 is H. In this way, the drive circuit 542 turns off (turns on) the LED 53a according to the pulse signal LED1a.

As shown in FIG. 3, the pulse generating circuit 541 generates the cyclic pulse signal LED1a indicating a turning on (turning off) pattern of the LED 53a in a case in which the signal WDT1 from the CPU 20 is H. The LED 53a blinks according to the cyclicity of the pulse signal LED1a. The pulse signal LED1a is at least a signal pattern for turning on the LED 53a in a pattern different from the general turning-on state.

As stated above, the drive circuit 531 turns on the LED 53a according to the operation of the CPU 10 of the system control circuit board 11 in a case in which there is no abnormality in the scanner circuit board 21. Further, the pulse generating circuit 541 and the drive circuit 542 control the display of the LED 53a in a case in which there is an abnormality in the scanner circuit board 21. In other words, the pulse generating circuit 541 and the drive circuit 542 notify the operation abnormality of the scanner circuit board 21 through the LED 53a in a case in which there is an abnormality in the scanner circuit board 21.

Next, the circuit for carrying out the display control of the LED 53b in the first constitution example shown in FIG. 2 is described.

The CPU 30 of the printer control circuit board 31 is directly connected with a pulse generating circuit 551 without the intervention of other CPU and the like. The CPU 30 outputs a signal (WDT2a) indicating the occurrence of abnormality to the pulse generating circuit 551 in a case in which the abnormality occurs. A watchdog signal for detecting the runaway of the CPU 30 may be used as the signal WDT2a.

The pulse generating circuit 551 takes that the signal WDT2a becomes a value (from "L: low" to "H: high") indicating the occurrence of abnormality as a trigger to output a pulse signal LED2a. The pulse generating circuit 551 outputs the pulse signal LED2a in a period when the signal WDT2a is H. The pulse signal LED2a is a cyclic signal.

The CPU 40 of the FIN control circuit board 41 is directly connected with a pulse generating circuit 552 without the intervention of other CPU and the like. The CPU 40 outputs a signal WDT2b indicating the occurrence of abnormality to the pulse generating circuit 552 in a case in which the abnormality occurs. A watchdog signal for detecting the runaway of the CPU 40 may be used as the signal WDT2b.

The pulse generating circuit 552 takes that the signal WDT2b becomes a value (from "L: low" to "H: high") indicating the occurrence of abnormality as a trigger to output a pulse signal LED2b. The pulse generating circuit 552 outputs the pulse signal LED2b in a period when the signal WDT2b is H. The pulse signal LED2b is a cyclic signal.

The pulse generating circuit 551 and the pulse generating circuit 552 output pulse signals of different patterns. For example, each of the pulse signal LED2a and the pulse signal LED2b has at least two or more than two cycles. At least one of the cycles of the pulse signal LED2a is different from one of the cycles of the pulse signal LED2b. That is, the signal pattern of the pulse signal LED2a is set to be different from the signal pattern of the pulse signal LED2b.

A toggle signal generating circuit 553 outputs a toggle signal TOG serving as a cyclic pulse signal in a case in which an operation abnormality occurs in at least one of the CPU 30 and the CPU 40. That is, the toggle signal generating circuit 553 inputs the signal WDT2a from the CPU 30 and the signal WDT2b from the CPU 40. The toggle signal generating circuit 553 outputs the toggle signal TOG in a case in which at least one of the input signal WDT2a and the signal WDT2b is "H". The toggle signal TOG output by the toggle signal generating circuit 553 has a pulse cycle which is longer than at least the pulse cycles of the pulse signals LED2a and LED2b.

A logic circuit 554 inputs the pulse signal LED2a, the pulse signal LED2b and the toggle signal TOG. The logic circuit 554 outputs either the pulse signal LED2a or the pulse signal LED2b as a valid signal according to the toggle signal TOG. The logic circuit 554 outputs a pulse signal LEDOFF2a which fixes the pulse signal LED2a to "L" periodically according to the toggle signal TOG. The logic circuit 554 outputs a pulse signal LEDOFF2b which fixes the pulse signal LED2b to "L" periodically according to the toggle signal TOG. The logic circuit 554 fixes each of the pulse signal LEDOFF2a and the pulse signal LEDOFF2b to "L" periodically in an exclusive manner according to the toggle signal TOG.

According to the example shown in FIG. 4, the logic circuit 554 outputs the pulse signal LEDOFF2a which validates the pulse signal LED2a in a period when the toggle signal TOG is "H". The pulse signal LEDOFF2a is set to be the same as the pulse signal LED2a in a period when the toggle signal TOG is "H", and is fixed to "L" in other periods. The logic circuit 554 outputs the pulse signal LEDOFF2b which validates the pulse signal LED2b in a period when the toggle signal TOG is "L". The pulse signal LEDOFF2b is set to be the same as the pulse signal LED2b in a period when the toggle signal TOG is "L", and, is fixed to "L" in other periods.

The drive circuit 556 cuts off the power supplied to the LED 53b in a case in which the pulse signal LEDOFF2a is H. That is, the drive circuit 556 turns off (turns on) the LED 53a according to the pulse signal LEDOFF2a. The drive circuit 557 cuts off the power supplied to the LED 53b in a case in which the pulse signal LEDOFF2b is "H". That is, the drive circuit 557 turns off (turns on) the LED 53a according to the pulse signal LEDOFF2b.

In addition, the output signal (toggle signal) of the toggle signal generating circuit 553 may be replaced with the input signal of a specific hard key 54. If the toggle signal is replaced with the input signal of the specific hard key 54, the signals switched between H and L according to the input of the hard key 54 are input to the logic circuit 554. In this case, the logic circuit 554 validates/invalidates either the pulse signal LED2a or the pulse signal LED2b according to the input of the hard key 54. As a result, the LED 53b can be controlled to be driven by either the pulse signal LED2a or the pulse signal LED2b according to the input of the hard key 54.

As stated above, the LED of the operation panel is controlled by the CPU of the system control circuit board when there is no abnormality in either of the printer control circuit board (first control circuit board) and the FIN control circuit board (second control circuit board). In a case in which there is an abnormality in the printer control circuit board (first control circuit board), the operation panel turns on the LED in a pattern indicating the abnormality of the first control circuit board every a predetermined period. In a case in which there is an abnormality in the FIN control circuit board (second control circuit board), the operation panel turns on the LED in a pattern indicating the abnormality of the second control circuit board every a predetermined period. Further, in a case in which there is an abnormality in both of the first and the second control circuit boards, the operation panel turns on one LED in a pattern indicating the abnormality of the first control circuit board and in a pattern indicating the abnormality of the second control circuit board alternately every a predetermined period.

As stated above, the digital multi-functional peripheral according to the present embodiment blinks the second LED or the first LED that is turned on normally in a cycle corresponding to the control circuit board in which operation abnormality occurs. In this way, the digital multi-functional peripheral according to the present embodiment can notify the user of the circuit board or the processor that is abnormal without any additional special display device. As a result, the digital multi-functional peripheral can reduce the machine downtime or the repair time for machine maintenance and decreases the cost in these jobs.

Next, a second constitution example for notifying the abnormality in the digital multi-functional peripheral according to the embodiment is described.

Figure 5:
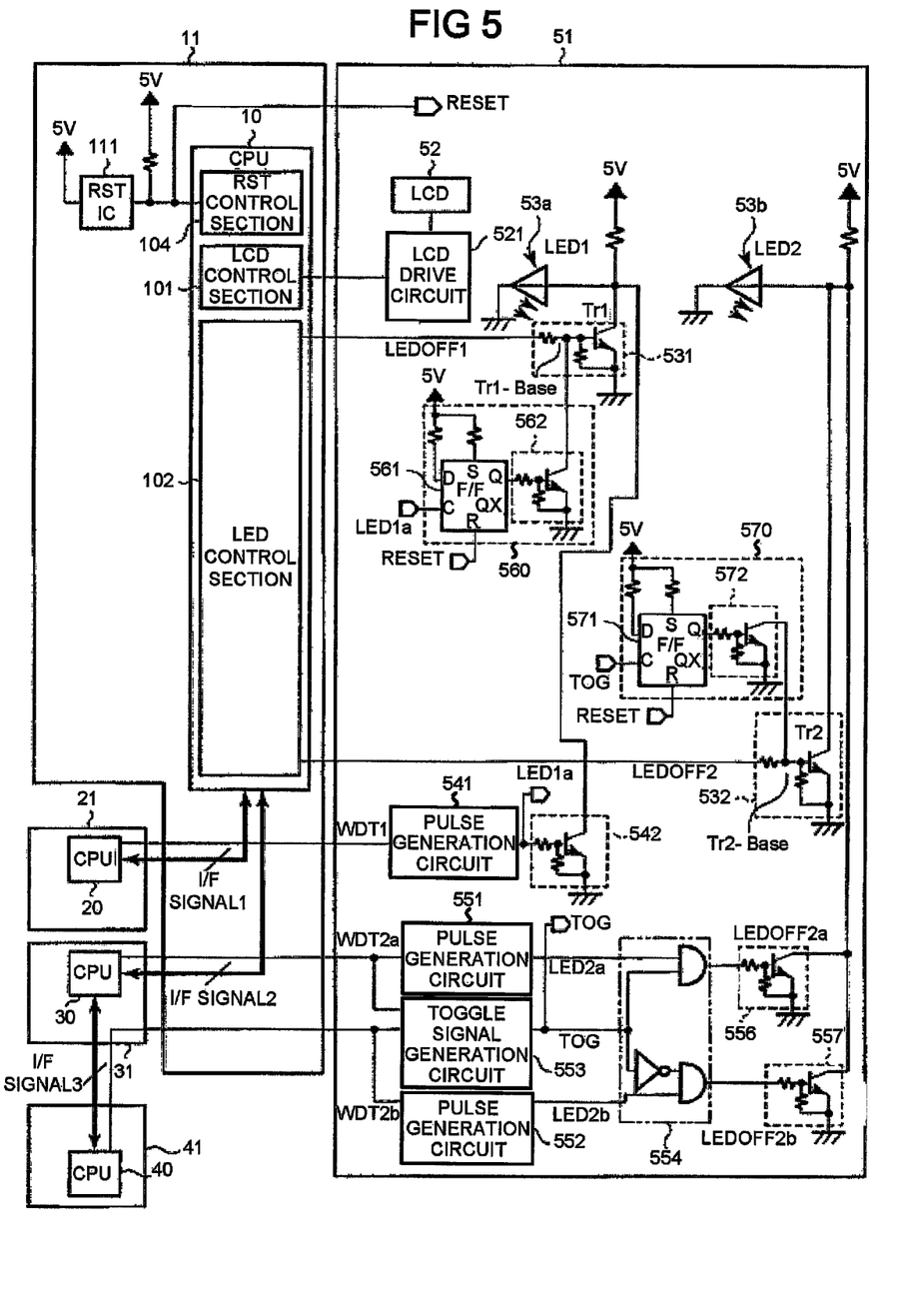
FIG. 5 is a block diagram illustrating a second constitution example of the control system in the digital multi-functional peripheral according to the embodiment.

FIG. 5 is a diagram illustrating the second constitution example of the control system including the panel circuit board 51.

Figure 6:
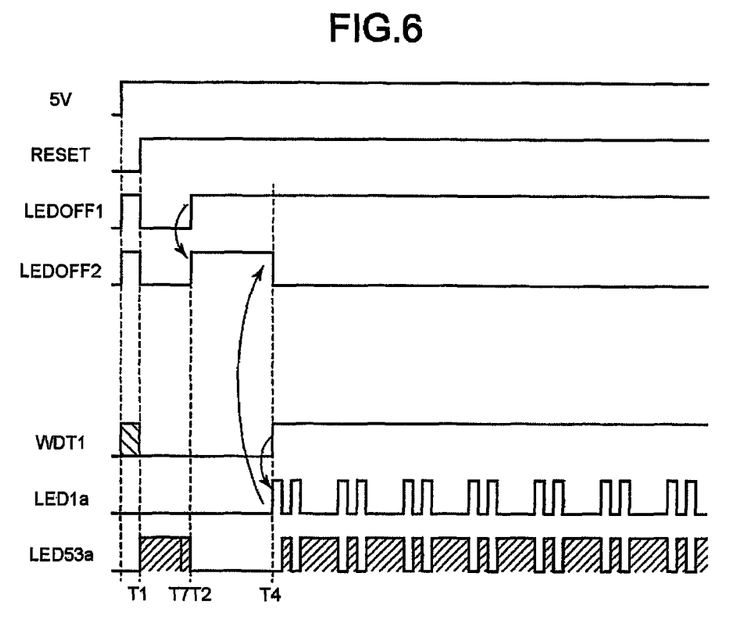
FIG. 6 is a timing chart in the control system of the second constitution example according to the embodiment.
Figure 7:
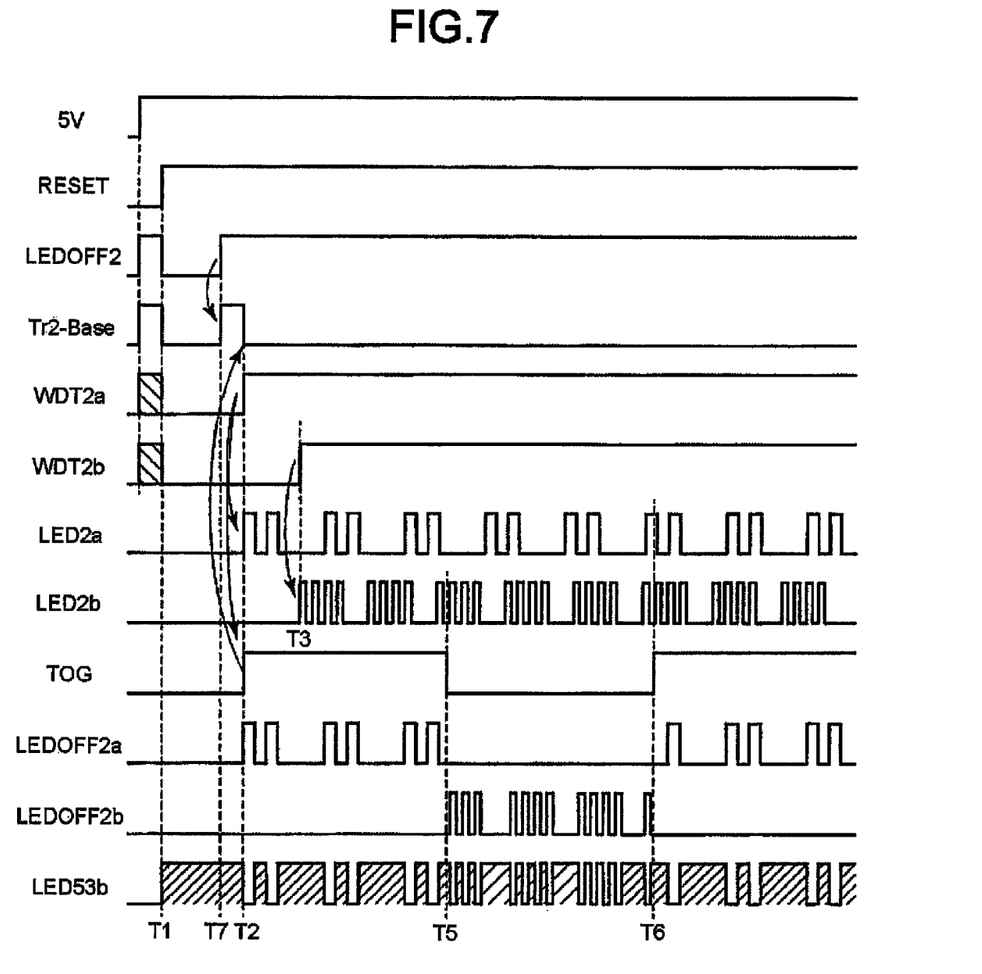
FIG. 7 is a timing chart in the control system of the second constitution example according to the embodiment.

FIG. 6 and FIG. 7 are timing charts illustrating an example of operation sequence in the second constitution example shown in FIG. 5.

The panel circuit board 51 in the second constitution example shown in FIG. 5 further includes a signal circuit 560 and a signal circuit 570 in addition to the first constitution example shown in FIG. 2. The system control circuit board 11 in the second constitution example shown in FIG. 5 includes a RST IC 111. The RST IC 111 outputs a reset signal. The CPU 10 of the system control circuit board 11 includes the function of a RST control section 104. The RST control section 104 has a function of initializing the internal circuit of the CPU 10.

Next, the display control of the LED 53a in the second constitution example shown in FIG. 5 is described.

The display of the LED 53a is controlled by the drive circuit 531, the pulse generating circuit 541 and the signal circuit 560. The drive circuit 531, the pulse generating circuit 541 and the drive circuit 542 operate in the same way as described in the first constitution example.

The signal circuit 560 includes a flip flop (F/F) circuit 561 and a drive circuit 562. As shown in FIG. 5, the F/F circuit 561 inputs the reset signal from the RST IC 111 of the system control circuit board 11 and the signal LED1a from the pulse generating circuit 541. The F/F circuit 561 is connected with the drive circuit 562. The drive circuit 562 is connected with the base of a transistor Tr1 of the drive circuit 531.

As shown in FIG. 6, if the pulse signal LED1a is input to the F/F circuit 561 in a state in which the reset signal RESET is H, the signal circuit 560 fixes the base potential of the drive circuit 531 to L. If the base potential of the drive circuit 531 is fixed to L, the LED 53a is turned into the turning-on state without regard to the state of the control signal LEDOFF1 from the CPU 10. For example, there is a possibility that the control signal LEDOFF1 from the CPU 10 is still H in a case in which an operation abnormality occurs in the CPU 10. In the second constitution example, the LED 53a blinks in response to the pulse signal LED1a even in such a case.

It is assumed in FIG. 6 that the control signal LEDOFF1 and the control signal LEDOFF2 become H due to the operation abnormality at time T7 after the release of reset. In the example shown in FIG. 6, the pulse signal LED1a occurs according to the signal WDT1 at time T4 after the time T7. If the pulse signal LED1a occurs at the time T4, the Tr1-Base signal becomes L. If the Tr-Base signal becomes L, the LED 53a is controlled to blink through the pulse signal LED1a without regard to the state of the control signal LEDOFF1.

Next, the display control of the LED 53b in the second constitution example shown in FIG. 5 is described.

The display of the LED 53b is controlled by the drive circuit 532, the pulse generating circuit 551, the pulse generating circuit 552, the toggle signal generating circuit 553, the logic circuit 554, the drive circuit 556, the drive circuit 557 and the signal circuit 570. The drive circuit 532, the pulse generating circuit 551, the pulse generating circuit 552, the toggle signal generating circuit 553, the logic circuit 554, the drive circuit 556 and the drive circuit 557 operate in the same way as described in the first constitution example shown in FIG. 2.

The signal circuit 570 includes a flip flop (F/F) circuit 571 and a drive circuit 572. As shown in FIG. 5, the F/F circuit 571 inputs the reset signal RESET from the RST IC 111 of the system control circuit board 11 and the toggle signal TOG from the toggle generating circuit 553. The F/F circuit 571 is connected with the drive circuit 572. The drive circuit 572 is connected with the base of a transistor Tr2 of the drive circuit 532.

As shown in FIG. 7, if the toggle signal TOG is input to the F/F circuit 571 in a state in which the reset signal RESET is H, the signal circuit 570 fixes the base potential of the drive circuit 532 to L. If the base potential of the drive circuit 532 is fixed to L, the LED 53b is turned into the turning-on state (can be controlled to blink through the pulse signal) without regard to the state of the control signal LEDOFF2 from the CPU 10. For example, the LED 53b blinks in response to the pulse signals LEDOFF2a and LEDOFF2b even if the control signal LEDOFF2 from the CPU 10 is still H due to the operation abnormality occurring in the CPU 10.

It is assumed in FIG. 7 that the control signal LEDOFF2 becomes H due to the operation abnormality at time T7 after the release of reset. In the example shown in FIG. 7, the toggle signal TOG occurs according to the signal WDT2a or the signal WDT2b at time T2 after the time T7. If the toggle signal TOG occurs, the Tr2-Base signal becomes L. If the Tr2-Base signal becomes L, the LED 53b is controlled to blink through the signal LEDOFF2a and the signal LEDOFF2b without regard to the state of the control signal LEDOFF2 from the CPU 10.

The display control carried out on the LED 53a or the LED 53b in the first or the second constitution example may also be applied to other display devices. For example, the same display control as that applied to the LED 53a or the LED 53b in the first or the second constitution example may also be applied to the backlight of the LCD 52. Further, the same display control as that applied to the LED 53a or the LED 53b in the first or the second constitution example may also be applied to the LED 61 arranged separately from the operation panel 5.

As stated above, the image forming apparatus according to the embodiment is provided with the control circuit board carrying at least one processor (CPU or SOC) which operates according to separate programs. The image forming apparatus is provided with the pulse generating circuit which outputs the pulse signal according to the signal from the processor indicating the abnormality and the drive circuit which blinks the display device in response to the pulse signal. With such a constitution, the image forming apparatus can immediately notify the user of the operation abnormality of each processor through the signal from each processor instead of through the control of a specific CPU.

The image forming apparatus blinks the display device arranged in the main body of the apparatus or the operation panel in response to the pulse signal output in a case in which the signal indicating the operation abnormality is received from each processor. In this way, the image forming apparatus can notify the user of the abnormality occurring in the apparatus without any additional dedicated display device.

Further, in a case in which the abnormality occurs at a plurality of positions, the image forming apparatus displays the display pattern indicating each abnormality position on one LED in time series. In this way, the image forming apparatus can notify the user of a plurality of abnormality positions through one display device of which the light-emitting state (on/off state) can be controlled.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An abnormality notification apparatus comprising:
a display;
a first processor configured to be carried on a system control circuit board;
a first drive circuit configured to be carried on a panel circuit board, and to output a signal to turn on the display according to the control signal from the first processor;
a second processor configured to be carried on a second control circuit board other than the system control circuit board, the second control circuit board being carried on each processing unit which constitutes a system and configured to control the processing unit;
a pulse generating circuit configured to be carried on the panel circuit board, and to be connected to the second processor without passing the first processor, and to output, during a period when a signal from the second processor indicates that an abnormality is input, a pulse signal corresponding to a blinking pattern for notifying the abnormality of the second processor; and
a second drive circuit configured to be carried on the panel circuit board, and to blink at the blinking pattern for notifying the abnormality of the second processor to the display in response to the pulse signal output by the pulse generating circuit regardless of the signal output by the first drive circuit.

2. The abnormality notification apparatus according to claim 1, wherein
the second drive circuit turns off the display which was turned on by the first drive circuit in response to the pulse signal from the pulse generating circuit.

3. The abnormality notification apparatus according to claim 1, comprising a plurality of second processors each corresponding to the second processor, and a plurality of pulse generating circuits each corresponding to the pulse generating circuit, wherein
each of the plurality of second processors is connected to a corresponding pulse generating circuit; and
each of the plurality of pulse generating circuits generates the pulse signal of the blinking pattern in which each differs.

4. The abnormality notification apparatus according to claim 3, wherein
each pulse signal which each pulse generating circuit generates is different from one another in at least one of frequency, duty ratio and cycle.

5. The abnormality notification apparatus according to claim 3, further comprising:
a selection circuit configured to validate, based on a period of notifying an abnormality assigned to more than two second processors within the plurality of second processors in time series, the pulse signal from the pulse generating circuit corresponding to the second processor which is in the period of notifying the abnormality; wherein
the second drive circuit blinks one display device based on a plurality of pulse signals validated by the selection circuit for each period.

6. The abnormality notification apparatus according to claim 3, further comprising:
at least one key; and
a selection circuit configured to validate the pulse signal from the pulse generating circuit corresponding to a specific second processor in a period when a specific key within the keys is input; wherein
the second drive circuit blinks, if there is a pulse signal notifying the abnormality of the specific second processor in a period when the specific key is input, the display based on the pulse signal.

7. The abnormality notification apparatus according to claim 1, further comprising:
a control circuit configured to take the signal from the second processor indicating the abnormality as a trigger to disable the control signal from the first processor, and turn the display into a state in which the display can be controlled to blink by the second drive circuit.

8. An image forming apparatus comprising:
an image forming section configured to form an image on an image receiving medium;
a display;
a first processor configured to be carried on a system control circuit board;
a first drive circuit configured to be carried on a panel circuit board to which the display is connected, and to output a signal to turn on the display according to the control signal from the first processor;
a second processor configured to be carried on a second control circuit board other than the system control circuit board, and configured to control the image forming section;
a pulse generating circuit configured to be carried on the panel circuit board, and to be connected to the second processor without passing the first processor, and to output, during a period when a signal from the second processor indicates that an abnormality is input, a pulse signal corresponding to a blinking pattern for notifying the abnormality of the second processor; and
a second drive circuit configured to be carried on the panel circuit board, and to blink at the blinking pattern for notifying the abnormality of the second processor to the display in response to the pulse signal output by the pulse generating circuit regardless of a signal output by the first drive circuit.

9. The image forming apparatus according to claim 8, further comprising:
a control circuit configured to take the signal from the second processor indicating the abnormality as a trigger to disable the control signal from the first processor, and turn the display into a state in which the display can be controlled to blink by the second drive circuit.

10. An abnormality notification method including:
outputting a signal to turn on a display, connected to a panel circuit board, according to a control signal from a first processor configured to be carried on a system control circuit board;
inputting a signal indicating an abnormality of any processor within at least one processor operating according to separate programs;
outputting, during a period when a signal from a second processor indicating an abnormality is input, a pulse signal corresponding to a blinking pattern for notifying the abnormality of the second processor by the pulse generating circuit, the second processor configured to be carried on a second control circuit board other than the system control circuit board, and the second control circuit board being carried on each processing unit which constitutes a system and configured to control a processing unit; and blinking at the blinking pattern for notifying the abnormality of the second processor to the display in response to the pulse signal which the pulse generating circuit outputs regardless of the signal to turn on the display.

11. The abnormality notification method according to claim 10, further comprising:
turning off the display in response to the pulse signal.

12. The abnormality notification method according to claim 10, further comprising:
generating the pulse signal of the blinking pattern via each of a plurality of pulse generating circuits each corresponding to the pulse generating circuit and connected to a corresponding plurality of second processors each corresponding to the second processor.

13. The abnormality notification method according to claim 12, wherein
each pulse signal which each pulse generating circuit generates is different from one another in at least one of frequency, duty ratio and cycle.

14. The abnormality notification method according to claim 12, further comprising:
validating, based on a period of notifying an abnormality assigned to more than two second processors within the plurality of second processors in time series, the pulse signal from the pulse generating circuit corresponding to the second processor which is in the period of notifying the abnormality; and
blinking one display device based on a plurality of pulse signals validated by a selection circuit for each period.

15. The abnormality notification method according to claim 12, further comprising:
validating the pulse signal from the pulse generating circuit corresponding to a specific second processor in a period when a specific key within keys is input; and
blinking, if there is a pulse signal notifying the abnormality of the specific second processor in a period when the specific key is input, the display based on the pulse signal.

16. The abnormality notification method according to claim 10, further comprising:
taking the signal from the second processor indicating the abnormality as a trigger to disable the control signal from the first processor; and
turning the display into a state in which the display can be controlled to blink.

* * * * *